US008929615B2

(12) United States Patent
Garcia et al.

(10) Patent No.: US 8,929,615 B2
(45) Date of Patent: Jan. 6, 2015

(54) FEATURE-EXTRACTION-BASED IMAGE SCORING (75) Inventors: David Harry Garcia, Sunnyvale, CA (US); Justin Mitchell, Palo Alto, CA (US)

(73) Assignee: Facebook, Inc., Menlo Park ( * ) Notice: Subject to any disclaimer, the term of this patent is extended or adjusted under 35 U.S.C. 154(b) by 311 days.

(21) Appl. No.: 13/288,825

(22) Filed: Nov. 3, 2011

(65) Prior Publication Data
US 2013/0114864 A1 May 9, 2013

(51) Int. Cl.
*G06K 9/46* (2006.01)
*G06F 15/16* (2006.01)
*G06Q 30/02* (2012.01)
*H04N 7/173* (2011.01)
*G06Q 50/00* (2012.01)

(52) U.S. Cl.
CPC .............. *G06Q 30/02* (2013.01); *H04N 7/173* (2013.01); *G06Q 50/01* (2013.01)
USPC ........................... 382/118; 382/190; 709/227

(58) Field of Classification Search
USPC ............... 382/118, 224, 190, 253, 251, 115; 375/240.03, 240.22, 245; 704/222, 704/230, 256.8; 707/698, 747; 711/208, 711/216; 705/14.45, 14.41, 319; 702/181, 702/179; 709/204, 227, 224, 206, 217, 208, 709/203
See application file for complete search history.

(56) References Cited

U.S. PATENT DOCUMENTS

| 6,901,156 | B2 | 5/2005 | Giger | |
| 7,779,032 | B1 * | 8/2010 | Garfinkel | 707/776 |
| 7,895,208 | B2 * | 2/2011 | Konopnicki | 707/738 |
| 8,340,451 | B2 * | 12/2012 | Noguchi et al. | 382/253 |
| 2011/0182482 | A1 | 7/2011 | Winters | |

FOREIGN PATENT DOCUMENTS

WO 01/18739 A1 3/2001

OTHER PUBLICATIONS

International Search Report and Written Opinion for International Application PCT/US2012/060212, Mar. 26, 2013.

* cited by examiner

*Primary Examiner* — Sheela Chawan
(74) *Attorney, Agent, or Firm* — Baker Botts L.L.P.

(57) ABSTRACT

Methods, apparatuses and systems directed to calculating a probability that a user or set of users will engage with a multimedia object for customizing content in a social networking system. In one embodiment, a generative model representing all users is utilized to calculate the probability that all users will interact with a given multimedia object. In another embodiment, the same generative model is utilized to calculate a user-specific engagement probability for a given multimedia object. In particular embodiments, the generative model uses Bayesian probability. In particular embodiments, one or more policies are applied to the photos to customize the browsing experience for users.

51 Claims, 6 Drawing Sheets

FEATURE-EXTRACTION-BASED IMAGE SCORING

TECHNICAL FIELD

The present disclosure relates generally to image analysis.

BACKGROUND

Social networks, or social utilities that track and enable connections between users (including people, businesses, and other entities), have become prevalent in recent years. In particular, social networking systems allow users to communicate information more efficiently. For example, a user may post contact information, background information, job information, hobbies, or other user-specific data to a location associated with the user on a social networking system. Other users can then review the posted data by browsing user profiles or searching for profiles including specific data. Social networking systems also allow users to associate themselves with other users, thus creating a web of connections among the users of social networking system. These connections among the users can be leveraged by the website to offer more relevant information to each user in view of the users' own stated interests in their connections.

A system, such as a website, that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access of particular information on the system, also provide information that can be stored in the user's record. The system may then use information provided by the user and information gathered about the user, to customize interactions of the system with the user.

Users may post multimedia objects, such as photos and videos, to share with other users of the social networking system. Traditionally, the uploading user controls the order in which multimedia objects are arranged in a photo album, and the social networking system determines based on a preset rule what photo to display to other users.

The figures depict various embodiments of the present disclosure for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to a social networking environment including a social networking system. A social networking system offers its users the ability to communicate and interact with other users of the social networking system. Users join the social networking system and then add connections to a number of other users to whom they desire to be connected. Once they are members of the social network, the users may interact with the social network itself, by posting stories and status messages on their own page, other users, by commenting, posting stories, etc. on other users' pages, or with non-user entities, such as fan pages that they subscribe to, online deals they redeem or subscribe to, or locations that they check in to. Additionally, users may upload multimedia objects, such as photos and videos, to the social networking system to share with other users of the social network. Users may take explicit actions on a social network to associate a photo with another element the social network, such as uploading a photo or video to an event page, or tagging individuals in the multimedia object. In particular embodiments, the social networking system may create implicit connections between user nodes and object nodes based on various factors, such as objects, brands, and locations recognized in uploaded photos through computer vision algorithms.

In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. The social network utilizes a social graph that includes nodes representing users and concepts in the social network environment as well as edges that define or represent connections between such nodes.

In particular embodiments, the social graph information includes a first set of user nodes that each correspond to a respective user, and a second set of concept nodes that each correspond to a respective concept. As used herein, a "user" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment.

By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph.

In particular embodiments, photographs uploaded to the social networking system are subject to an image object recognition algorithm. The image object recognition algorithm compares the uploaded image to images stored in a photographic object database and searches for similar objects. Methods for object searching are well-known in the art, and may include frequency-domain image processing, filtering, wavelet analysis, feature extraction, learning-algorithms such as neural networks, texture recognition, and the like. This disclosure contemplates any type of computer vision algorithms for finding matching objects. This disclosure hereby incorporates by reference commonly-owned U.S. utility patent application, U.S. patent application Ser. No. 13/212,344 entitled, "Computer-Vision Content Detection for Connecting Objects in Media to Users," previously filed on 18 Aug. 2011.

The present disclosure extends these concepts by scoring an uploaded multimedia object based on a generative model that predicts how engaging the multimedia object is to all users, a particular user, or a particular set of users.

Various portions of such a social networking platform may be implemented via a hardware architecture or software framework that enables various software components or processes to implement particular embodiments, as is described in more detail, by way of example and not by way of limitation, below. The platform may include one or more hardware or software components, one or more of which may be located or embodied in one or more consolidated or distributed computing systems. Additionally, as used herein, "or" may imply "and" as well as "or;" that is, "or" does not necessarily preclude "and," unless explicitly stated or implicitly implied.

Figure 1:
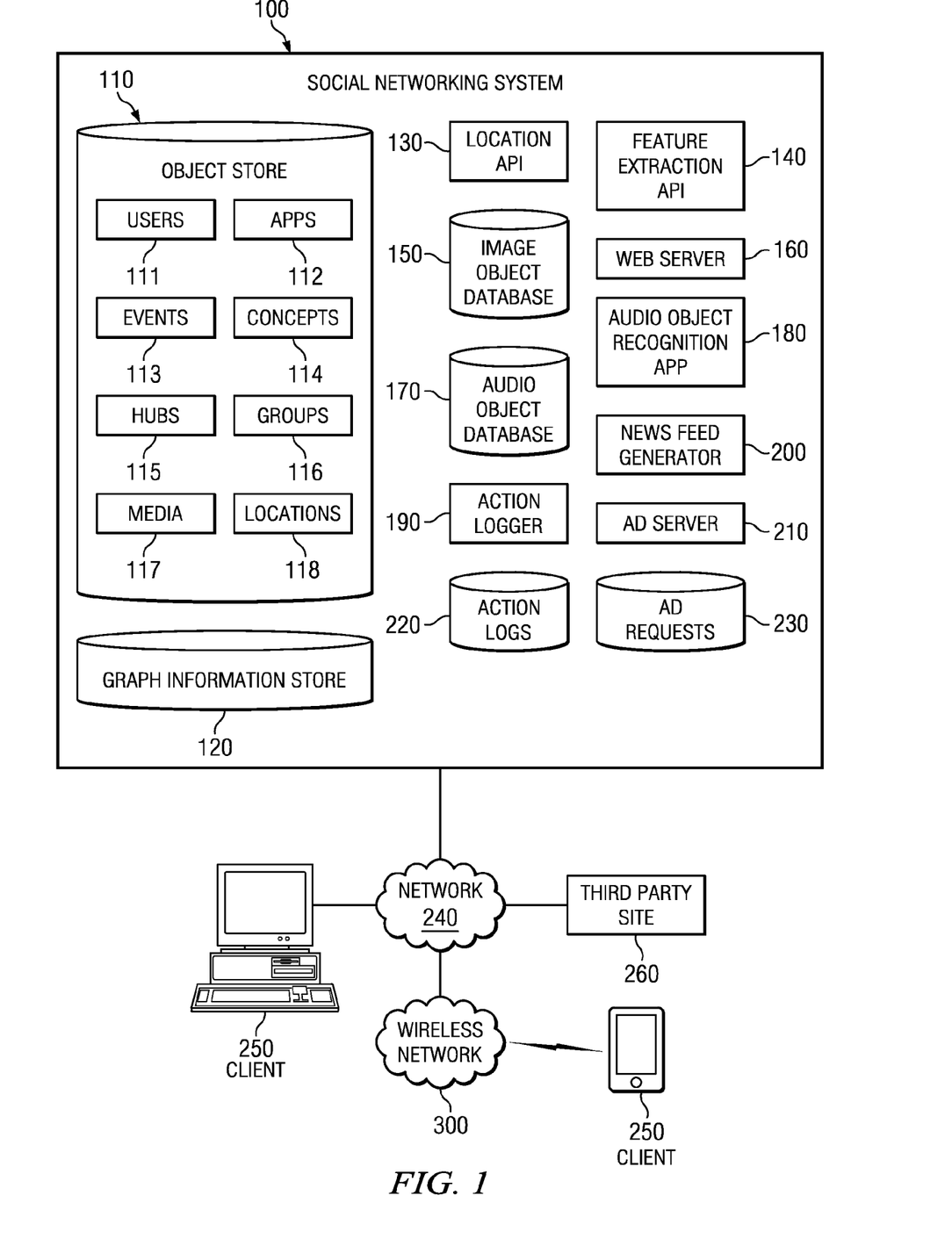
FIG. 1 illustrates an example architecture for a social networking system.

FIG. 1 is a high-level block diagram of a social networking system including an image-based object determination system according to one embodiment. FIG. 1 illustrates a social networking system 100, client devices 250, wireless cellular network 300, and third-party website 260. It is understood that wireless cellular network 300 represents multiple wireless cellular networks provided by a plurality of carriers. Client device 250 is depicted as a mobile phone, but client device 250 may comprise any type of computing device, including mobile phone, laptop, netbook tablet, cable box, television, etc. Client device 250 is any device with both a data connection to network 240. Client device 250 need not have a direct connection to network 240 or wireless data network 300. For example, client device 250 may be a digital camera with a Bluetooth connection to a modem. Client device 250 has one or more memories capable of storing captured multimedia objects such as photos, videos, and audio files.

Social networking system 100 comprises a computing system that allows members to communicate or otherwise interact with each other and access content as described herein. Social networking system 100 stores member profiles that describe the members of a social network, including biographic, demographic, and other types of descriptive information, such as work experience, educational history, hobbies or preferences, location, and the like. Social networking system 100 may be a website that further stores data describing one or more relationships between different members. The relationship information may indicate members who have similar or common work experience, group memberships, hobbies, or educational history.

A user of the client device 250 interacts with the social networking system 100 via an application, such as a web browser or a native application, to perform operations such as browsing content, posting and sending messages, retrieving and sorting messages received from other users, uploading multimedia objects, and the like. Client device 250 may also use an application or browser to pull and view profile information for various user nodes and hubs in social networking system 100.

Social networking system 100 comprises an object store 110, and a graph information store 120. The object store 110 stores information on objects, such as users, represented in or by the social networking environment 100. The graph information store 120 stores information on the relationships of the objects in the object store 110.

Object store 110 includes various storage areas. User store 111 includes profile pages for specific user accounts or members of social networking system 100. Hubs store 115 includes profile or hub pages for concept nodes such as businesses, locations, and celebrities. Apps store 112 includes third-party applications that users may install and run on their profile page. Media store 117 includes uploaded user media such as photos, videos, audio files, and other types of multimedia objects.

Image object database 150 stores information regarding physical real-world objects or logos, that may be associated with concept nodes, such as brand, product, or company. Image object database 150 may also include multiple images associated with real-world physical locations. Image object database 150 is communicatively coupled to hubs store 115, concepts store 114, events store 113, and locations store 118.

In one implementation, each object can be maintained as a node in a social graph or other data structure maintained by the social networking system. Social networking system 100 may allow users to access information regarding each object using a client application (e.g., a browser) hosted by a wired or wireless station, such as a laptop, desktop or mobile device. For example, social networking system may serve web pages (or other structured documents) to users that request information about an object. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users.

Feature extraction API 140 accesses photographic object database 150. Photographic object database 150 contains a collection of images of logos, products, brands, and the like. In particular embodiments, photographic object database 150 includes, for each photo, an association with a particular concept node stored in concept store 114. In particular embodiments, searchable text extracted through OCR is stored in association with photo images containing signage or other sources of text. For example, photographic object database 150 may store the text "Coca-Cola" in a searchable format in association with a photo of a Coca-Cola product. In particular embodiments, photographic object database 150 stores a link to the node associated with the object, and pulls text or other related data directly from the node as necessary.

Feature extraction API also extracts a number of features from photos. For example, feature extraction API may detect the number of people in a photo, the gender of people in a photo, the size of their faces, whether or not they are smiling, and, dependent on facial recognition algorithms, the identity and user node of people detected in photographs. In particular embodiments, Feature extraction API 140 may also extract information about the photo itself via EXIF data or other forms of metadata. This disclosure contemplates any suitable type of feature extraction by feature extraction API 140.

Photographic object database 150 may be updated to keep the photographs current. In particular embodiments, photos and videos received from other users may be utilized to update photographic object database 150. In particular embodiments, location feature extraction API 140 may pull images from third-party sites 260 such as Yelp! or Google Images to update photographic object database 150.

Additionally, social networking system 100 includes a web server 160, an action logger 190, an action log 220, a newsfeed generator 200, an ad server 210, and a database of ad requests 230. In other embodiments, social networking system 100 may include additional, fewer, or different modules for various applications.

Web server 160 links social networking system 100 via network 240 to one or more client devices 250, as well as to one or more third party websites 260. Web server 160 may include a mail server or other messaging functionality for receiving and routing messages between social networking system 100 and client devices 250 or third party websites 260. The messages can be instant messages, queued messages (e.g., email), text and SMS messages, or any other suitable messaging technique.

Action logger 190 is capable of receiving communications from the web server 160 about member actions on or off social networking system 100. Newsfeed generator 200 generates communications for each member about information that may be relevant to the member. These communications may take the form of stories, each story is an information message comprising one or a few lines of information about an action in the action log that is relevant to the particular member. The stories are presented to a member via one or more pages of the social networking system 100, for example in each member's home page or newsfeed page.

Ad server 210 performs an ad selection algorithm. Ad server 210 is communicatively coupled to the database of ad requests 230 and to action log 220 for this purpose.

Figure 2:
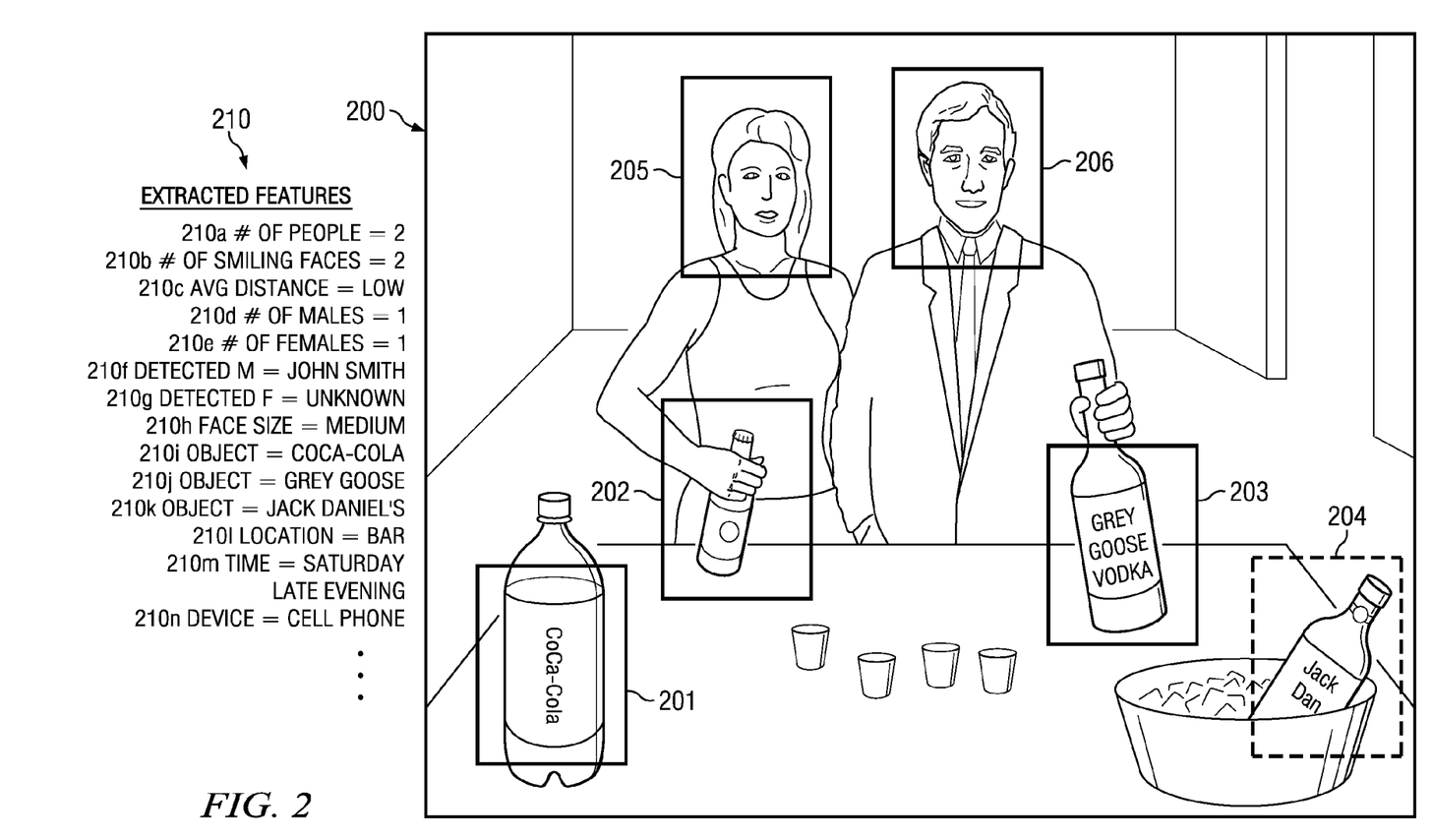
FIG. 2 is an example photo image uploaded by a user of the social networking system.

FIG. 2 illustrates an example user-uploaded image 200. Image 200 includes, for didactic purposes, faces 205 and 206, and various objects 201-204 that may be recognized by feature extraction API 140 upon reception by social networking system 100. Image object 201, in this case, a bottle of "Coca-Cola", may be detected through optical character recognition or other computer vision techniques. Similarly feature extraction API 140 may detect the beverage 202 through comparison of the logo with a number of saved logos in photographic object database 150. Although the example image 200 includes 4 types of product labels this disclosure contemplates detecting any type of image object, such as signage in the background of photos, cars, famous buildings, and the like. For example, object image recognition algorithm may recognize the make and model of a vehicle in a picture of a person sitting in his or her new car, and tag the image accordingly. Similarly, feature extraction API 140 may detect signage at corporate-sponsored events. This disclosure contemplates any type of object recognition.

Feature extraction API 160 may also extract other features of a given multimedia object or image. For example, API 160 may detect the number of people in image 200. In particular embodiments, API 160 may detect the gender of the people in photo 200. In particular embodiments, API 160 may, through facial recognition algorithms, match detected faces to users in the social networking system. In particular embodiments, API 160 may detect the relative or average distance between users in photograph 200. In particular embodiments, API 160 may detect the size of the faces detected in photograph 200. In particular embodiments, API 160 may detect the number of people who are actually looking at the camera lens in photo 200. In particular embodiments, API 160 may detect or estimate the ethnicity of individuals in photo 200. In particular embodiments, API 160 may estimate the state of undress of the people in photo 200, by detecting large swaths of a set of common colors, such as identified skin tones. This disclosure contemplates any suitable method of feature extraction through application of computer vision algorithms.

In particular embodiments, API 140 may also extract information from metadata or EXIF data attached to the uploaded image. For example, in particular embodiments, API 140 may determine the time of day a photo was captured, the day of the week it was captured, the type of device or camera with which the photo was captured, and the settings with which the photo was captured (such as the aperture, exposure, shutter speed, ISO setting, focal length, flash settings, etc.) from the EXIF data appended to the image file. In particular embodiments, where the capture device includes location data from GPS or geo-tagging, API 140 may extract the location from which the image was captured. In particular embodiments, API 140 may extract the resolution and color depth from the image, whether the image was modified and by what software, the metering and autofocus settings, or any other metadata of the image. This disclosure contemplates extracting and coding any suitable data from an image file.

Extracted features 210 displays a list of features or characteristics 210a-210n extracted by API 140 from photo 200. In particular embodiments, each feature corresponds to a characteristic or feature node in the social graph. In particular embodiments, extracted data may be categorized into generally characteristic nodes. For example, time characteristic 210m indicates that the photo was taken late on a Saturday evening. While the EXIF or metadata for the photograph may be expressed in a month, day, year, time format, (for example, Saturday, Jan. 24, 2011 at 23:39 PST), it is unlikely that such a degree of granularity is necessary to identify patterns in the level of engagement of the photo. Thus in particular embodiments, various extracted features may be generalized and placed into broad feature categories such as "captured Saturday" or "captured during evening." In particular embodiments, a specific characteristic node may be generated for the precise date and time, and the social networking system may generate edges from the precise date/time node to a broader feature category node. This disclosure contemplates any suitable method of generating and categorizing nodes representing extracted features of multimedia objects.

Figure 3:
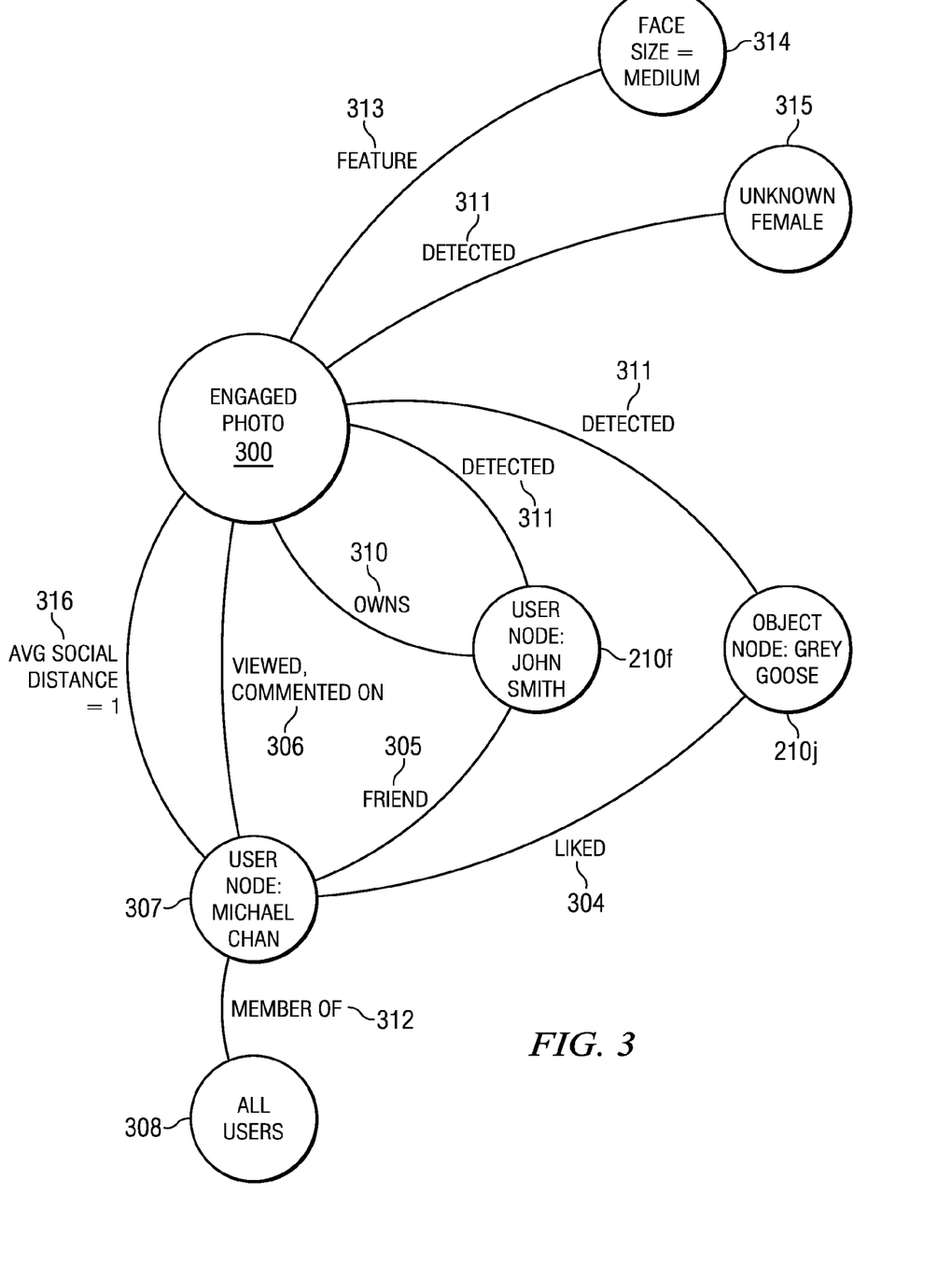
FIG. 3 is an example set of features extracted from a photo and mapped to nodes in a portion of an example social graph.

FIG. 3 illustrates, for didactic purposes, an example portion of a social graph for an engaged photo 300. For the purposes of this application, an "engaged photo" is a photo or multimedia object (such as a video) that is interacted with on the social networking system. For example, whenever a user views a photos, the social networking system generates an edge from the photo node to the user who viewed the photo. For example, photo 300 was viewed and commented on by a user, "Michael Chan", represented by user node 307. The social network then generates an edge 306 indicating that user 307 interacted with photo 300. In particular embodiments, the social networking system generates a separate edge connection for each interaction or engagement; for example, the social networking system may generate a "viewed edge" as well as a "commented edge" between nodes 300 and 307. In particular embodiments, the social networking system generates one "engagement edge" containing all the actions performed by user node 307 on multimedia object 300. This disclosure contemplates any suitable method of maintaining a log of user actions for a particular photo.

The social networking system may generate engagement edges between photo 300 and a specific user node such as node 307, or a specialized node for all users 306. Thus in particular embodiments, the social networking system tracks the degree of engagement for a given photo for all users. In particular embodiments, a direct edge may be generated from engaged photo 300 to node 306 representing all users. In particular embodiments, a "member of" edge 312 may be generated between user node 307 and all users node 306. In particular embodiments, the social networking system may generate custom nodes representing a set of more than one user. For example, users may be placed into "buckets" based on social demographics, such as age, social proximity, and the like. As an example, photo 300 may be highly engaged by single male users in the 21 to 28 age group, and the social networking system, upon detecting this pattern, may add the photo to a model or profile for the single males in the 21-28 age group, or any other "bucket" of users.

The social graph may contain nodes for each of the features 210a-210n extracted by API 140. For the sake of clarity, only four extracted features are displayed in FIG. 3, but one of ordinary skill would easily recognize that a separate node may exist for each of the features 210a-n. In particular embodiments, the nodes are preexisting user and object nodes detected by API 140, such as detected user node 210f "John Smith" and detected object node "Grey Goose Vodka" 210j. Each of the aforementioned nodes 210f and 210j are connected to the node for engaged photo 300 via "detected" edges 311, indicating that the features were detected by feature extraction API 140. In particular embodiments, the nodes may be generic nodes, such as the node 315 representing an "unknown female." In particular embodiments, features are defined by an edge and a node, such as a "detected" edge 311 and nodes 315, 210f and 210j. In particular embodiments, features are defined only by a node, such as "face size=medium" node 314 connected by a generic "feature" edge 313. This disclosure contemplates any suitable manner of representing extracted features 210a-n on a social graph.

In particular embodiments, nodes on the social networking system associated with engaged photo 300, such as user and object nodes 210f and 210j, may include explicit edge connections to user nodes that have engaged photo 300 or other nodes on the social networking system (not shown). For example, user node 307 has "liked" Grey Goose 310j, and the social networking system connects the two nodes via a "liked" edge 304. However, it is possible, in particular embodiments, that the majority of extracted features 210a-210n are represented by nodes on the social networking system that are invisible to the users, and therefore do not contain explicit edge connections to other nodes. For example, the node 315, representing the characteristic that one of the detected people in the photo is an "unknown female", is generally invisible to users, and users cannot "like", comment on, or otherwise explicitly interact with this node. However, it may be the case that the user consistently and frequently views multimedia objects with unknown females. This relationship is captured in the generative model as described with respect to FIG. 4.

In particular embodiments, the social networking system may calculate features of engaged photo 300 that are specific to a particular user. For example, the social networking system may calculate, the number of users detected in the photo who are friends with the viewing user. As another example, the social networking system may calculate an average social distance between the users detected in a photograph and the users viewing the photo. For example, if there are three users detected in a photo, and two are friends with the viewing user (one degree of separation) and one is a friend of a friend, the average social distance would be 1.33. In particular embodiments, the social networking system may calculate or utilize a social coefficient that expresses the closeness between two users on the social networking system. For example, a user is more likely to view a photo containing friends that he often chats, messages, or otherwise interacts with on the social networking system. This disclosure contemplates any suitable manner of utilizing social networking information between the users detected in the photo and the viewing user. In particular embodiments, this social networking information may be expressed as an edge between the photo and the viewing user node, such as edge 316, which contains information about the average social distance between the detected users in photo 300 and user node 307.

Figure 4:
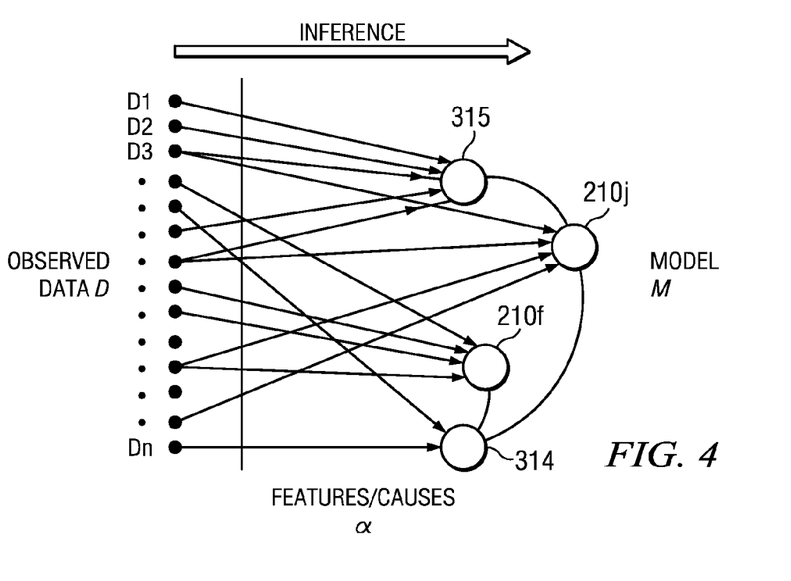
FIG. 4 is an example generative model for predicting the probability of engagement for a photo having a particular set of features.

FIG. 4 graphically depicts a generative model for calculating an engagement metric for a particular model or profile. Generative model M may correspond to a single user profile, such as user node 307, group of users, or all users, such as node 306. Thus, in particular embodiments, the social networking system may have a generalized model for all users 306 as well as a model for each user of the social networking system. As described above, users may be categorized into social demographics, such as all single males between 21 and 28, and the social networking system may maintain a model for each demographic group it is tracking. In particular embodiments, the models may be separate from one another. In particular embodiments, the models may be interdependent on each other. For example, the model for all users may be a weighted average of all the models for the users of the social networking system. This disclosure contemplates any number of models and degree of interdependency.

In particular embodiments, the engagement metric is calculated by Bayesian probability. For didactic purposes, the model M of FIG. 4 is the model/profile for user node 307. In particular embodiments, the generative model, also referred to as a "latent variable model" or "causal model", includes a set of multivariate data D, in this case, a set of photos $D_1$-$D_n$ that user 307 has permission to view. In particular embodiments, the social networking system may maintain a separate model for each type of engagement for each type of user. For example, the social networking system may only draw links between data points and features for photos that user 307 has commented on, and generate a separate model for the probability a user comments on a given photo. In particular embodiments, each type of link is assigned a different weight, for example, commenting on or "liking" a photo may be factored more heavily than simply viewing a photo. For didactic purposes, the links include all interactions of any manner, including viewing. The multivariate data D may be explained in terms of a set of underlying causes α. In the generative model of FIG. 4, the causes are the extracted features from photos $D_1$-$D_n$, in this example, detected unknown female 315, detected user node 210f, detected object node 210j, and medium-sized detected faces 314. The extracted features may be connected by one or more links that represent how the causes interact with each other. For example, it may be possible that unknown female faces 315 are often detected in the same photograph as Grey Goose vodka 210j. In particular embodiments, the links may be linear (as in the case of factor analysis), or more generally they may instantiate highly non-linear interactions among the features or between the features or the data. In particular embodiments, the data set D is updated dynamically, that is, as users upload photos or multimedia objects to the social networking system, new data points Dn are added, and as users interact with photos by viewing, liking, commenting, etc. on photos, new links are added from the photos to the features for the user or users that interacted with the photos.

There are two fundamental problems to solve in the generative model. One is to infer the best set of features to represent a specific data item $D_1$-$D_n$ in set D. The other is to learn the best model, M, for explaining the entire set of data D. The first problem may be seen as one of perception, while the second is one of adaptation.

In particular embodiments, inferring the best set of causes to explain a given piece of data involves maximizing the posterior over a (or alternatively computing its mean).

$$\hat{\alpha} = \underset{\alpha}{\operatorname{argmax}} \ P(\alpha \mid D_i M)$$

$$\hat{\alpha} = \underset{\alpha}{\operatorname{argmax}} \ P(D_i \mid \alpha_i, M) P(\alpha \mid M)$$

In particular embodiments, the model M specifies the set of potential causes, their prior probabilities, and the generative process by which they give rise to the data. Learning a specific model M, that best accounts for all the data is accomplished by maximizing the posterior distribution over the models, which according to Bayes' rule is:

$$P(M \mid D) \alpha P(D \mid M) P(M)$$

In particular embodiments, the calculation is agnostic in the prior over the model, and thus the model maximizes the likelihood of P(D|M); i.e., the probability that the user engages the entire set of photos. The total probability that user 307 engages a photo for all the data is therefore:

$$P(D \mid M) = P(D_1 \mid M) \times P(D_2 \mid M) \times \ldots \times P(D_n \mid M)$$

$$P(D \mid M) = \Pi_i P(D_i \mid M)$$

where $D_i$ denotes an individual data item (e.g., a particular image). The probability of the user engaging an individual data item (i.e., any particular photo) is thus obtained by summing over all the possible features for the data:

$$P(D_i \mid M) = \sum_{\alpha} P(D_i \mid \alpha, M) P(\alpha \mid M)$$

In other words, the probability that a user or set of users engages a particular photo $D_i$ for a model M is the summation of the probability that a user engages the particular photo given that the photo has a certain feature, multiplied by the probability that a user engages all photos having that feature the certain feature, for all features. In particular embodiments, this sum may be approximated by other less-computationally-intensive functions. Although this disclosure describes a particular method of calculating a probability of engagement (or "engagement metric"), any suitable mathematical method may be employed. In particular embodiments, genetic algorithms may be utilized. Methods of generating learning models based on observed occurrences are well-known in the art.

Figures 5, 6:
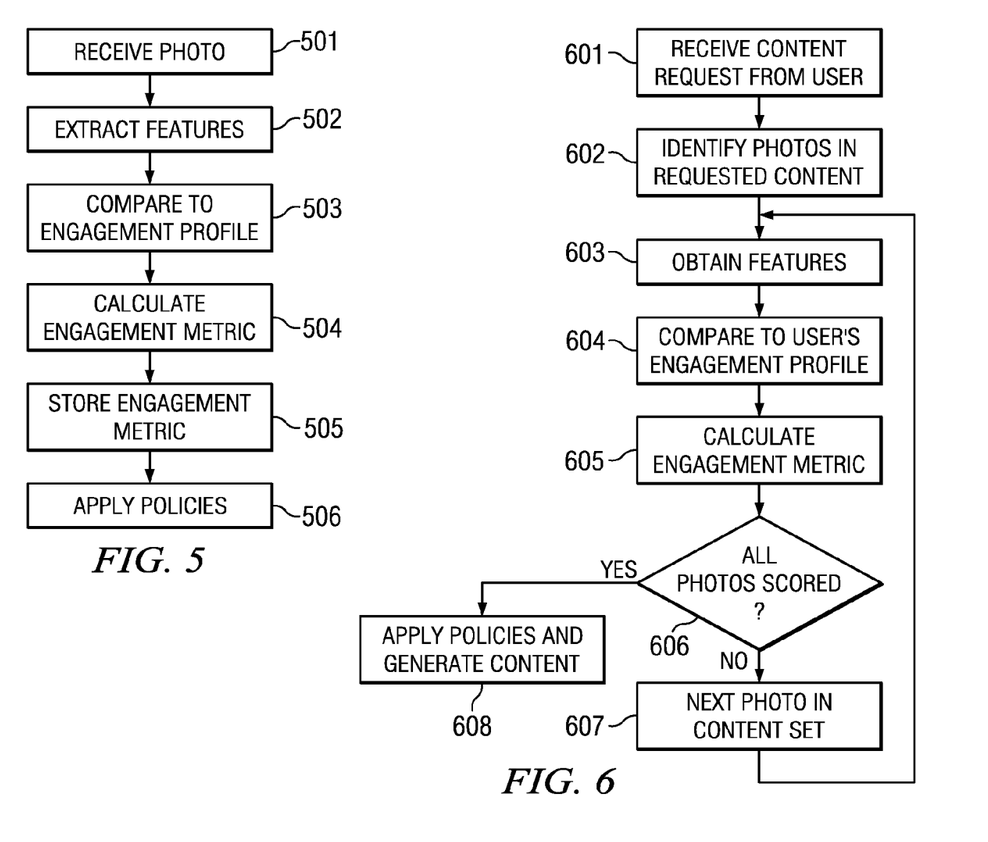
FIG. 5 illustrates an example method of calculating an engagement metric for a particular set of users.
FIG. 6 illustrates an example method of dynamically calculating an engagement metric for a particular user.

FIG. 5 depicts an example method of generating a generalized engagement metric for an uploaded photo or multimedia object. In particular embodiments, the generalized engagement metric is the probability that all users interact with a particular photo. The model M is essentially a model of all users, and the set D is the set of all photos in the social networking system. Because of the computational complexity of calculating this probability, the generalized engagement metric may be calculated upon the photo upload, and then updated at predetermined intervals, such as one week.

At Step 501, the social networking system receives a multimedia object (in this example, a photo). As is well-known in the art users may upload photos to the social networking system through a variety of network connections, such as through a traditional wired internet connection and PC, or a wireless cellular data network through a mobile device such as a mobile phone or tablet. In particular embodiments, uploaded photos have privacy settings that specify what users on the social networking system may view the photo. In particular embodiments, the generative model takes into account the potential audience of a photo versus its degree of engagement; photos that have a low potential audience (i.e., it is visible to very few people) will naturally have a very low degree of engagement. Although FIG. 5 describes a method of calculating an engagement metric for all users, it should be readily apparent that the method of FIG. 5 may be applied to generating an engagement metric for any model, whether for a single user or a set of demographically grouped users.

At Step 502, feature extraction API 140 extracts the various features discussed with respect to FIG. 2 from the uploaded image. In particular embodiments, feature extraction API 140 begins extracting features immediately upon upload. In particular embodiments, feature extraction API 140 cycles through the uploaded photos in accordance with a load-balancing algorithm. For example, if a large number of users upload photos simultaneously, feature extraction API 140 may queue photos at a later time so as to not overtax the processors of the social networking system.

In Step 503, the social networking system compares the extracted features to the features of a global engagement profile, and in Step 504 the social networking system calculates a global engagement metric. Mathematically, Steps 503 and 504 occur in the same step. The social networking system calculates the probability that all users will engage the uploaded photo based upon a model M that represents all users.

At Step 505, the engagement metric is stored in association with the photo. In particular embodiments, the engagement metric may be updated based upon newer observed interactions or engagements. In particular embodiments, the engagement metric is updated substantially in real time. In particular embodiments, the engagement metric is updated periodically at predetermined intervals. This disclosure contemplates any suitable method of updating the engagement metric.

At Step 505, the social networking system applies various policies to the photo based on its calculated engagement metric. For example, the social networking system may not show the photo to a user in his or her newsfeed if the engagement metric is below a predetermined threshold. In particular embodiments, the social networking system may boost photos with a high engagement metric to the top of a user's newsfeed, or promote the photos with a high engagement metric to the album cover. In particular embodiments, the social networking system may increase the permanence of photos in users' newsfeeds for photos having an engagement metric over a predetermined threshold. In particular embodiments, the social networking system may promote photos with an engagement metric above a predetermined threshold to different portions of the uploading user's profile. In particular embodiments, the social networking system prioritizes photos with higher engagement metrics for sponsored stories. This disclosure contemplates any suitable policy or action performed by the social networking system for photos based on engagement metric.

FIG. 6 illustrates an example method of generating a view including one or more photos based on the engagement metric for the photos for the user requesting the view. Because of the diversity of interests between individual users of the social networking system, it is desirable for the social networking system to personalize each user's browsing experience based on that user's particular preferences. For example, one user may view pictures of food consistently and frequently, whereas another user may consistently avoid viewing them. The process of FIG. 6 allows the social networking system to specifically tailor content to the viewing user.

At Step 601, the social networking system receives a request for content from a particular user. The content may be any web or mobile web content that includes one or more photos or links to one or more photos, such as a newsfeed, place page, the user's own profile page, another user's profile page, business hub page, fan page, and the like. In particular embodiments, any view that pulls from a set of photos is also considered to "contain" the photos. For example, generally when a user posts a set of photos, the most recently posted four photos are included in a newsfeed story for display to the user's friends. Although the newsfeed view does not contain all the photos in the album, because it contains a link to the entire set of photos, the newsfeed view is, for the purposes of this application, considered to include every single photo or multimedia object in the album.

At Step 602, the social networking system identifies all the photos that may possibly be displayed in the content. As discussed above, the set of all the photos may include photo sets from which photos are to be pulled. As another example, viewing a user's profile page may include four or five photos in which the user is tagged; generally these are arranged chronologically, but the social networking system may pull from the entire set of photos in which the users is tagged. The process then begins a loop for each identified photo.

At Step 603, feature extraction API 140 obtains the features for the first photo in the set of photos identified in Step 602. This process is substantially identical to the feature extraction processes as described above.

At Step 604, the social networking system compares the extracted features to the features of the requesting user's model or engagement profile, and at Step 605, the social networking system generates an engagement metric for the particular photo and particular user model M. As described above, mathematically Steps 604 and 605 occur in the same step.

At step 606, the social networking system checks if engagement metrics have been calculated for all photos, if not, the process selects the next photo in Step 607 and loops back to extracting the features for that photo in Step 603. The process continues until all photos have been scored.

At Step 608, the social networking system applies a set of predetermined policies and generates the requested view/content for display to the user. For example, the social networking system may generate a newsfeed view including a photo album story for the user, wherein the four photos displayed in the newsfeed story are the four photos with the highest engagement score uploaded within a predetermined period. Thus, a user is informed that new photos were uploaded, but on the most personally interesting photos are displayed. As another example, when a user requests to view another user's profile, the top four photos by engagement score may be displayed at the top of the other user's profile. In particular embodiments, the engagement score may be used as album covers when a user requests to view a thumbnail view of all of another user's albums; each album cover would comprise the most personally interesting photo within that album. In particular embodiments, photos may be sorted by engagement metric; for example, if a user clicks another user's albums, the photos with the most personally interesting photos will be displayed to the requesting user first. This disclosure contemplates any suitable policy based on engagement metrics. Through application of the method of FIG. 6, the social networking system may tailor individual users' browsing experiences such that the photos they wish to see are surfaces with greater frequency, and photos they generally avoid will effectively vanish from their browsing experience.

Figure 7:
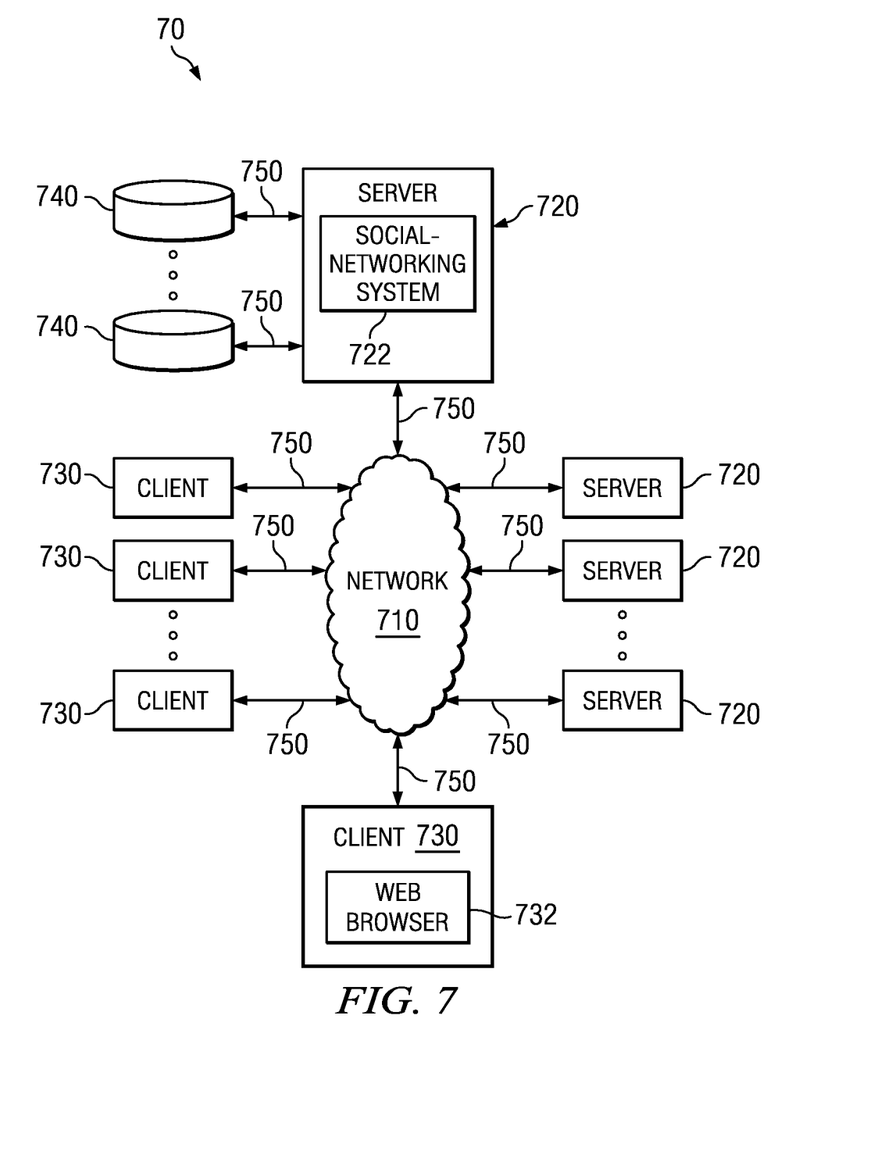
FIG. 7 illustrates an example network environment

While the foregoing embodiments may be implemented in a variety of network configurations, the following illustrates an example network environment for didactic, and not limiting, purposes. FIG. 7 illustrates an example network environment 700. Network environment 700 includes a network 710 coupling one or more servers 720 and one or more clients 730 to each other. Network environment 700 also includes one or more data storage 740 linked to one or more servers 720. Particular embodiments may be implemented in network environment 700. For example, social networking system frontend 120 may be written in software programs hosted by one or more servers 720. For example, event database 102 may be stored in one or more storage 740. In particular embodiments, network 710 is an intranet, an extranet, a virtual private network (VPN), a local area network (LAN), a wireless LAN (WLAN), a wide area network (WAN), a metropolitan area network (MAN), a portion of the Internet, or another network 710 or a combination of two or more such networks 710. The present disclosure contemplates any suitable network 710.

One or more links 750 couple a server 720 or a client 730 to network 710. In particular embodiments, one or more links 750 each includes one or more wired, wireless, or optical links 750. In particular embodiments, one or more links 750 each includes an intranet, an extranet, a VPN, a LAN, a WLAN, a WAN, a MAN, a portion of the Internet, or another link 750 or a combination of two or more such links 750. The present disclosure contemplates any suitable links 750 coupling servers 720 and clients 730 to network 710.

In particular embodiments, each server 720 may be a unitary server or may be a distributed server spanning multiple computers or multiple datacenters. Servers 720 may be of various types, such as, for example and without limitation, web server, news server, mail server, message server, advertising server, file server, application server, exchange server, database server, or proxy server. In particular embodiments, each server 720 may include hardware, software, or embedded logic components or a combination of two or more such components for carrying out the appropriate functionalities implemented or supported by server 720.

In particular embodiments, one or more data storages 740 may be communicatively linked to one or more servers 720 via one or more links 750. In particular embodiments, data storages 740 may be used to store various types of information Particular embodiments may provide interfaces that enable servers 720 or clients 730 to manage, e.g., retrieve, modify, add, or delete, the information stored in data storage 740.

In particular embodiments, each client 730 may be an electronic device including hardware, software, or embedded logic components or a combination of two or more such components and capable of carrying out the appropriate functions implemented or supported by client 730. For example and without limitation, a client 730 may be a desktop computer system, a notebook computer system, a netbook computer system, a handheld electronic device, or a mobile telephone. The present disclosure contemplates any suitable clients 730. A client 730 may enable a network user at client 730 to access network 730. A client 730 may enable its user to communicate with other users at other clients 730.

A client 730 may have a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 730 may enter a Uniform Resource Locator (URL) or other address directing the web browser 732 to a server 720, and the web browser 732 may generate a Hyper Text Transfer Protocol (HTTP) request and communicate the HTTP request to server 720. Server 720 may accept the HTTP request and communicate to client 730 one or more Hyper Text Markup Language (HTML) files responsive to the HTTP request. Client 730 may render a web page based on the HTML files from server 720 for presentation to the user. The present disclosure contemplates any suitable web page files. Herein, reference to a web page encompasses one or more corresponding web page files (which a browser may use to render the web page) and vice versa, where appropriate.

Figure 8:
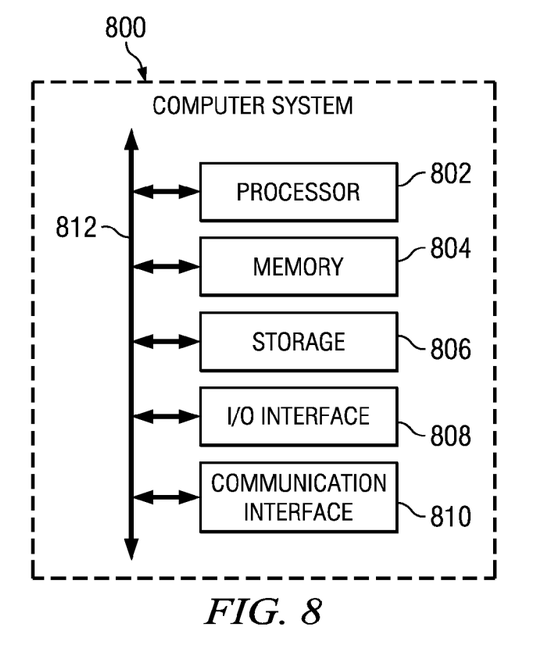
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple datacenters; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 9:
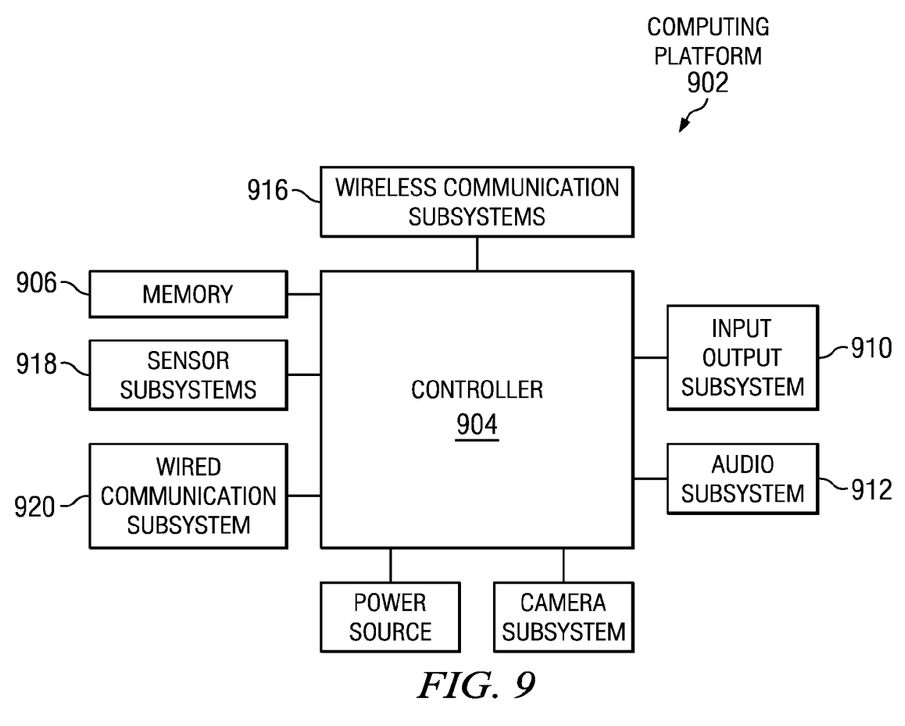
FIG. 9 illustrates an example mobile client device.

The client-side functionality described above can be implemented as a series of instructions stored on a computer-readable storage medium that, when executed, cause a programmable processor to implement the operations described above. While the client device 250 may be implemented in a variety of different hardware and computing systems, FIG. 9 shows a schematic representation of the main components of an example computing platform 902, according to various particular embodiments. Multipoint sensing devices generally include a controller 904 which may comprise a microcontroller or one or more processors configured to execute instructions and to carry out operations associated with a computing platform. In various embodiments, controller 904 may be implemented as a single-chip, multiple chips or other electrical components including one or more integrated circuits and printed circuit boards. Controller 904 may optionally contain a cache memory unit for temporary local storage of instructions, data, or computer addresses. By way of example, using instructions retrieved from memory, controller 904 may control the reception and manipulation of input and output data between components of computing platform 902.

Controller 904 together with a suitable operating system may operate to execute instructions in the form of computer code and produce and use data. The operating system, other computer code (including control client 907 described below) or data may be physically stored within a memory block 906 that is operatively coupled to controller 904. Memory block 906 encompasses one or more storage media and generally provides a place to store computer code (e.g., software or firmware) and data that are used by the computing platform 902. Memory block 906 may also include one or more fixed storage devices in the form of, by way of example, solid-state hard disk drives (HDDs), among other suitable forms of memory coupled bi-directionally to controller 904. Information may also reside on a removable storage medium loaded into or installed in multipoint sensing devices when needed.

Controller 904 is also generally coupled to a variety of interfaces such as graphics control, video interface, input interface, output interface, and storage interface, and network interface, and these interfaces in turn are coupled to the appropriate devices. In certain embodiment, Controller 904 may connected to an input structure 914 and display 916 may be provided together, such an in the case of a touchscreen where a touch sensitive mechanism is provided in conjunction with the display 916. In such embodiments, the user may select or interact with displayed interface elements via the touch sensitive mechanism. In this way, the displayed interface may provide interactive functionality, allowing a user to navigate the displayed interface by touching the display 916.

Electric signals (e.g., analog) may be produced by microphone 910 and fed to earpiece 912. Controller 904 may receive instruction signals from input structure 914 and control the operation of display 916. By way of example, display 916 may incorporate liquid crystal display (LCD), light emitting diode (LED), Interferometric modulator display (IMOD), or any other suitable display technology. Audio signals may be transmitted and received by means of an antenna 917 that may be connected through a radio interface 920 or audio input interface such as microphone 924 to codec 922 configured to process signals under control of controller 904. Additionally, multipoint sensing devices may be powered power source 932.

Computing platform 902 may also include one or more user input devices 934 (other than input structure 914) that are operatively coupled to the controller 904. Generally, input devices 934 are configured to transfer data, commands and responses from the outside world into multipoint sensing devices. By way of example, mobile device may include a keyboard or mouse. Input devices 934 may also include one or more hard buttons.

Display device 916 is generally configured to display a graphical user interface (GUI) that provides an easy to use visual interface between a user of the computing platform 902 and the operating system or application(s) running on the mobile device. Generally, the GUI presents programs, files and operational options with graphical images. During operation, the user may select and activate various graphical images displayed on the display 916 in order to initiate functions and tasks associated therewith.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

The present invention has been explained with reference to specific embodiments. For example, while embodiments of the present invention have been described as operating in connection with a social network system, the present invention can be used in connection with any communications facility that allows for communication of messages between users, such as an email hosting site. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising, by one or more computing systems:
   extracting one or more features from a photo;
   calculating an engagement metric for the photo based on the one or more extracted features, wherein the engagement metric represents the probability that one or more users will interact with the photo; and
   applying one or more policies to the photo based on the engagement metric.

2. The method of claim 1, wherein the engagement metric is specific to a particular user.

3. The method of claim 1, wherein the engagement metric is generalized to a plurality of users.

4. The method of claim 1, interacting with the photo comprising viewing, commenting on, or liking the photo.

5. The method of claim 1, the extracting one or more features comprising:
   applying one or more image object recognition algorithms to the photo;
   detecting one or more image objects via the one or more algorithms; and
   for each detected object, associating the photo with an object node representing the detected object in a social graph.

6. The method of claim 1, the extracting one or more features comprising:
   applying one or more facial recognition algorithms to the photo;
   detecting one or more faces via the one or more algorithms; and
   for each detected face, associating the photo with a user node representing the detected face in a social graph.

7. The method of claim 1, the extracting one or more features comprising applying one or more facial recognition algorithms to the photo, wherein one of the one or more features comprises the number of faces detected in the photo.

8. The method of claim 1, the extracting one or more features comprising applying one or more gender recognition algorithms to the photo, wherein one of the one or more features comprises the gender of the people in the photo.

9. The method of claim 1, the extracting one or more features comprising applying one or more facial recognition algorithms to the photo, wherein one of the one or more features comprises the number of smiling faces detected in the photo.

10. The method of claim 1, the extracting one or more features comprising applying one or more image recognition algorithms to the photo, and wherein one of the one or more features comprises the distance between the people detected in the photo.

11. The method of claim 1, the extracting one or more features comprising applying one or more facial recognition algorithms to the photo, wherein one of the one or more features comprises the size of the faces detected in the photo.

12. The method of claim 1, the extracting one or more features comprising applying one or more image recognition algorithms to the photo, wherein one of the one or more features comprises the number of people looking at the camera detected in the photo.

13. The method of claim 1, wherein the one or more features comprises the time the photo was captured.

14. The method of claim 1, wherein the one or more features comprises the location where the photo was captured.

15. The method of claim 1, wherein the one or more features comprises the type of device that captured the photo.

16. The method of claim 1, the calculating the engagement metric comprising:
assigning a weight to each of the one or more extracted features, wherein each weight is adjusted substantially in real-time based on actual engagement; and
calculating a weighted average using the assigned weights.

17. The method of claim 16, wherein the weights are assigned via Bayesian probability functions.

18. A non-transitory, computer-readable media comprising instructions operable, when executed by one or more computing systems, to:
extract one or more features from a photo;
calculate an engagement metric for the photo based on the one or more extracted features, wherein the engagement metric represents the probability that one or more users will interact with the photo; and
apply one or more policies to the photo based on the engagement metric.

19. The media of claim 18, wherein the engagement metric is specific to a particular user.

20. The media of claim 18, the instructions operable to extract one or more features comprising instructions operable to:
apply one or more image object recognition algorithms to the photo;
detect one or more image objects via the one or more algorithms; and
for each detected object, associate the photo with an object node representing the detected object in a social graph.

21. The media of claim 18, wherein the engagement metric is generalized to a plurality of users.

22. The media of claim 18, interacting with the photo comprising viewing, commenting on, or liking the photo.

23. The media of claim 18, the instructions operable to extract one or more features comprising instructions operable to:
apply one or more facial recognition algorithms to the photo;
detect one or more faces via the one or more algorithms; and
for each detected face, associate the photo with a user node representing the detected face in a social graph.

24. The media of claim 18, the instructions operable to extract one or more features comprising instructions operable to apply one or more facial recognition algorithms to the photo, wherein one of the one or more features comprises the number of faces detected in the photo.

25. The media of claim 18, the instructions operable to extract one or more features comprising instructions operable to apply one or more gender recognition algorithms to the photo, wherein one of the one or more features comprises the gender of the people in the photo.

26. The media of claim 18, the instructions operable to extract one or more features comprising instructions operable to apply one or more facial recognition algorithms to the photo, wherein one of the one or more features comprises the number of smiling faces detected in the photo.

27. The media of claim 18, the instructions operable to extract one or more features comprising instructions operable to apply one or more image recognition algorithms to the photo, wherein one of the one or more features comprises the distance between the people detected in the photo.

28. The media of claim 18, the instructions operable to extract one or more features comprising instructions operable to apply one or more facial recognition algorithms to the photo, wherein one of the one or more features comprises the size of the faces detected in the photo.

29. The media of claim 18, the instructions operable to extract one or more features comprising instructions operable to apply one or more image recognition algorithms to the photo, wherein one of the one or more features comprises the number of people looking at the camera detected in the photo.

30. The media of claim 18, wherein the one or more features comprises the time the photo was captured.

31. The media of claim 18, wherein the one or more features comprises the location where the photo was captured.

32. The media of claim 18, wherein the one or more features comprises the type of device that captured the photo.

33. The media of claim 18, the instructions operable to calculate the engagement metric comprising instructions operable to:
assigning a weight to each of the one or more extracted features, wherein each weight is adjusted substantially in real-time based on actual engagement; and
calculating a weighted average using the assigned weights.

34. The media of claim 33, wherein the weights are assigned via Bayesian probability functions.

35. A system comprising:
one or more processors; and
a memory coupled to the processors comprising instructions executable by the processors, the processors being operable when executing the instructions to:
extract one or more features from a photo;
calculate an engagement metric for the photo based on the one or more extracted features, wherein the engagement metric represents the probability that one or more users will interact with the photo; and
apply one or more policies to the photo based on the engagement metric.

36. The system of claim 35, wherein the engagement metric is specific to a particular user.

37. The system of claim 35, wherein the engagement metric is generalized to a plurality of users.

38. The system of claim 35, interacting with the photo comprising viewing, commenting on, or liking the photo.

39. The system of claim 35, the instructions to extract one or more features comprising instructions to:
apply one or more image object recognition algorithms to the photo;
detect one or more image objects via the one or more algorithms; and
for each detected object, associate the photo with an object node representing the detected object in a social graph.

40. The system of claim 35, the instructions to extract one or more features comprising instructions to:
apply one or more facial recognition algorithms to the photo;
detect one or more faces via the one or more algorithms; and
for each detected face, associate the photo with a user node representing the detected face in a social graph.

41. The system of claim 35, the instructions to extract one or more features comprising instructions to apply one or more facial recognition algorithms to the photo, wherein one of the one or more features comprises the number of faces detected in the photo.

42. The system of claim 35, the instructions to extract one or more features comprising instructions to apply one or more gender recognition algorithms to the photo, wherein one of the one or more features comprises the gender of the people in the photo.

43. The system of claim 35, the instructions to extract one or more features comprising instructions to apply one or more facial recognition algorithms to the photo, wherein one of the one or more features comprises the number of smiling faces detected in the photo.

44. The system of claim 35, the instructions to extract one or more features comprising instructions to apply one or more image recognition algorithms to the photo, wherein one of the one or more features comprises the distance between the people detected in the photo.

45. The system of claim 35, the instructions to extract one or more features comprising instructions to apply one or more facial recognition algorithms to the photo, wherein one of the one or more features comprises the size of the faces detected in the photo.

46. The system of claim 35, the instructions to extract one or more features comprising instructions to apply one or more image recognition algorithms to the photo, wherein one of the one or more features comprises the number of people looking at the camera detected in the photo.

47. The system of claim 35, wherein the one or more features comprises the time the photo was captured.

48. The system of claim 35, wherein the one or more features comprises the location where the photo was captured.

49. The system of claim 35, wherein the one or more features comprises the type of device that captured the photo.

50. The system of claim 35, the instructions to calculate the engagement metric comprising instructions to:
   assign a weight to each of the one or more extracted features, wherein each weight is adjusted substantially in real-time based on actual engagement; and
   calculate a weighted average using the assigned weights.

51. The system of claim 50, wherein the weights are assigned via Bayesian probability functions.

* * * * *